US009700060B2

(12) United States Patent
Inoue et al.

(10) Patent No.: US 9,700,060 B2
(45) Date of Patent: Jul. 11, 2017

(54) CONTOUR MEASUREMENT APPARATUS AND CONTOUR MEASUREMENT METHOD FOR MEASURING CONTOUR OF POULTRY CARCASS, AND DEBONING DEVICE FOR POULTRY CARCASS

(71) Applicant: MAYEKAWA MFG. CO., LTD., Tokyo (JP)

(72) Inventors: Noriyuki Inoue, Tokyo (JP); Shinji Hane, Tokyo (JP); Kenichi Oka, Tokyo (JP); Koji Takanashi, Tokyo (JP); Naoki Toyoda, Tokyo (JP); Hiroyuki Sakurayama, Tokyo (JP); Noriyuki Takahashi, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 15/323,094

(22) PCT Filed: Jun. 25, 2015

(86) PCT No.: PCT/JP2015/068360
§ 371 (c)(1),
(2) Date: Dec. 29, 2016

(87) PCT Pub. No.: WO2016/002630
PCT Pub. Date: Jan. 7, 2016

(65) Prior Publication Data
US 2017/0156354 A1    Jun. 8, 2017

(30) Foreign Application Priority Data

Jun. 30, 2014  (JP) .................. 2014-134086
Jun. 30, 2014  (JP) .................. 2014-134087
Jun. 30, 2014  (JP) .................. 2014-134088

(51) Int. Cl.
*A22C 21/00*  (2006.01)
*G01B 5/20*  (2006.01)

(52) U.S. Cl.
CPC ...... *A22C 21/0023* (2013.01); *A22C 21/0046* (2013.01); *A22C 21/0053* (2013.01); *A22C 21/0084* (2013.01); *G01B 5/20* (2013.01)

(58) Field of Classification Search
CPC .................. A22C 21/00; A22C 21/0038
(Continued)

(56) References Cited

U.S. PATENT DOCUMENTS 5,312,291 A    5/1994 van den Nieuwelaar et al.
5,314,374 A    5/1994 Koch et al.
(Continued)

FOREIGN PATENT DOCUMENTS

JP    H067074       1/1994
JP    H11266780    10/1999
(Continued)

OTHER PUBLICATIONS

"International Search Report (Form PCT/ISA/210)", mailed on Oct. 6, 2015, with English translation thereof, pp. 1-4.
(Continued)

*Primary Examiner* — Richard Price, Jr.
(74) *Attorney, Agent, or Firm* — Jianq Chyun IP Office

(57) ABSTRACT

A contour measurement apparatus and a contour measurement method for measuring a contour of a poultry carcass, and a deboning device for a poultry carcass are provided. The contour measurement apparatus includes: a fixing jig on which the poultry carcass is placed and fixed; a conveyer forming a conveyance path for conveying the fixing jig; a contact element being supported movably in an upper and lower direction within a two-dimensional plane, and being able to be in contact with a measurement target portion of the
(Continued)

poultry carcass; an upper and lower direction position sensor for detecting a position of the contact element in the upper and lower direction; a fixing jig position sensor for detecting a position of the fixing jig moving in a conveying direction; and a contour calculation unit for calculating a contour of a surface of the poultry carcass on the two-dimensional plane based on detected values.

12 Claims, 4 Drawing Sheets

(58) Field of Classification Search
USPC .............. 452/148, 149–156, 157–161, 165
See application file for complete search history.

(56) References Cited

U.S. PATENT DOCUMENTS

| | | | | |
|---|---|---|---|---|
| 5,512,013 | A * | 4/1996 | Passchier | A22C 17/004 452/136 |
| 5,573,454 | A * | 11/1996 | Fox | A22C 11/02 452/29 |
| 5,954,574 | A | 9/1999 | Verrijp et al. | |
| 6,059,648 | A | 5/2000 | Kodama et al. | |
| 6,322,437 | B1 * | 11/2001 | Grabau | A22C 25/16 452/135 |
| 6,935,942 | B1 | 8/2005 | Evers et al. | |
| 7,452,266 | B2 * | 11/2008 | Bottemiller | A22C 7/00 452/150 |
| 7,828,635 | B2 * | 11/2010 | Paulsohn | A22C 25/147 452/116 |
| 8,387,522 | B2 * | 3/2013 | Rusko | A22C 17/0086 222/240 |
| 8,529,321 | B2 * | 9/2013 | Weber | A22C 17/0086 452/134 |
| 8,753,177 | B2 * | 6/2014 | Schroder | A22C 17/12 452/134 |
| 2006/0270331 | A1 | 11/2006 | Fujiwara et al. | |
| 2009/0275275 | A1 | 11/2009 | Evers | |
| 2012/0231716 | A1 | 9/2012 | Janssen et al. | |

FOREIGN PATENT DOCUMENTS

| | | |
|---|---|---|
| JP | 2002527088 | 8/2002 |
| JP | 2010501169 | 1/2010 |
| JP | 2011125317 | 6/2011 |
| JP | 2011177096 | 9/2011 |
| JP | 2012249599 | 12/2012 |
| JP | 2013046632 | 3/2013 |
| WO | 2004052107 | 6/2004 |

OTHER PUBLICATIONS

"International Preliminary Report on Patentability" issued to PCT/JP2015/068358, mailed on Jan. 3, 2017, with English translation thereof, pp. 1-17.

"International Preliminary Report on Patentability" issued to PCT/JP2015/068359, mailed on Jan. 3, 2017, with English translation thereof, pp. 1-18.

"International Preliminary Report on Patentability" issued to PCT/JP2015/068360, mailed on Jan. 3, 2017, with English translation thereof, pp. 1-16.

"International Preliminary Report on Patentability" issued to PCT/JP2015/068361, mailed on Jan. 3, 2017, with English translation thereof, pp. 1-17.

* cited by examiner

CONTOUR MEASUREMENT APPARATUS AND CONTOUR MEASUREMENT METHOD FOR MEASURING CONTOUR OF POULTRY CARCASS, AND DEBONING DEVICE FOR POULTRY CARCASS

CROSS-REFERENCE TO RELATED APPLICATION

This application is a 371 of international application of PCT application serial no. PCT/JP2015/068360, filed on Jun. 25, 2015, which claims the priority benefits of Japan application no. 2014-134086, filed on Jun. 30, 2014, Japan application no. 2014-134087, filed on Jun. 30, 2014, and Japan application no. 2014-134088, filed on Jun. 30, 2014. The entirety of each of the above-mentioned patent applications is hereby incorporated by reference herein and made a part of this specification.

TECHNICAL FIELD

The present invention relates to a contour measurement apparatus and a contour measurement method for measuring a contour of a poultry carcass, and a deboning device for a poultry carcass.

BACKGROUND

In a general process of butchering a poultry carcass such as a chicken, into a meat portion and a bone portion, butchering, deboning, and removal of guts and the like (evisceration) are performed after feather removal and blood draining. Human labor cannot efficiently perform the butchering/deboning processing for poultry carcasses, and thus has been taken over by automated processes. For many years, the present applicants have been engaged in development of automatic deboning technique for a poultry carcass.

The automatic deboning processing is executed for an upper body of a poultry carcass which is eviscerated and which has the leg portions and breast meat removed. Here, the poultry carcass is fixed on a conical fixing jig known as a "cone" to be in an appropriate posture during the entire deboning processing. In the processing, the poultry carcasses in this state is subjected to the deboning processing executed by a plurality of processing units.

In an automatic deboning device disclosed in Patent Document 1, a plurality of the cones stand at an equal interval on an outer edge portion of a rotatable disk, and a plurality of processing units are arranged in the periphery of the disk. The deboning processing is executed with the disk, on which the upper body of the poultry carcass is placed and fixed, rotating so that the upper body of the poultry carcasses sequentially moves to the processing units.

CITATION LIST

Patent Literature

Patent Document 1: Re-publication of PCT Internal Publication No. WO2004/052107

SUMMARY

Technical Problem

The automatic deboning device described in Patent Document 1 can yield a large amount of meat portion, different among poultry carcasses due to their individual variation in size, only when cutting blades used in each processing unit and other devices are properly positioned for each poultry carcass. Thus, a contour measurement apparatus and a contour measurement method achieving easy measurement of a contour of a desired area of a poultry carcass have been called for.

The present invention is made in view of the above issue regarding the conventional technique, and an object thereof is to provide a contour measurement apparatus and a contour measurement method for measuring a contour of a poultry carcass with which a contour of a desired area of the poultry carcass can be easily recognized, as well as a deboning device for a poultry carcass.

Solution to Problem

A contour measurement apparatus for measuring a contour of a poultry carcass according to some embodiments of the present invention is a contour measurement apparatus for measuring a contour of a poultry carcass which is eviscerated and which has leg portions removed, the contour measurement apparatus including: a fixing jig on which the poultry carcass is placed and fixed; a conveyer forming a conveyance path for the fixing jig and configured to convey the fixing jig along the conveyance path; a contact element that is supported movably in an upper and lower direction within a two-dimensional plane including a conveying direction of the fixing jig and extending in a vertical direction, and is able to be in contact with a measurement target portion of the poultry carcass; an upper and lower direction position sensor configured to detect a position of the contact element in the upper and lower direction; a fixing jig position sensor configured to detect a position of the fixing jig moving in the conveying direction; and a contour calculation unit configured to calculate a contour of the measurement target portion of the poultry carcass on the two-dimensional plane based on detected values obtained by the upper and lower direction position sensor and the fixing jig position sensor along with a movement of the poultry carcass held and conveyed by the fixing jig.

In the contour measurement apparatus for measuring a contour of a poultry carcass described above, the contact element contacts the measurement target portion of the poultry carcass in the two-dimensional plane along with the movement of the fixing jig. The contact element in contact with the measurement target portion of the poultry carcass moves on the two-dimensional plane along with the movement of the fixing jig, while being in contact with the measurement target portion of the poultry carcass. Thus, when the measurement target portion of the poultry carcass has recesses and protrusions, the contact element contacts the recesses and protrusions. The contour calculation unit is configured to calculate the contour of the measurement target portion of the poultry carcass on the two-dimensional plane based on the detected values obtained by the upper and lower direction position sensor and the fixing jig position sensor, while the contact element is in contact with the poultry carcass. Thus, with the contour measurement apparatus for measuring a contour of a poultry carcass thus obtained, the contour of a desired area of the poultry carcass can be recognized.

For example, the contour calculating unit uses polar coordinates to calculate a contact position based on the length of the contact element in an axial direction and an angle of the contact element in contact with the poultry carcass. The contact element can be arranged more freely than an image capturing device such as a camera, and thus can be arranged at a desired position. Thus, the contour of a desired area of the poultry carcass can be obtained with the contact element arranged at an appropriately selected position.

In some embodiments, the contact element is disposed at a position above the fixing jig which is moved, and is supported pivotally about an axis that extends in a horizontal direction orthogonally to the conveying direction of the fixing jig, and extends downward so that a tip portion of the contact element is to be in contact with a shoulder portion of the poultry carcass.

In this configuration, the contact element is supported pivotally about the axis that extends in the horizontal direction orthogonally to the conveying direction of the fixing jig, and extends downward so that the tip portion of the contact element is to be in contact with a shoulder portion of the poultry carcass. Thus, the contact element moves while being in contact with the surface of the shoulder portion of the poultry carcass, conveyed along with the movement of the fixing jig. Thus, the contour of the shoulder portion of the poultry carcass can be formed on the two-dimensional plane, whereby the contour of the shoulder portion of the poultry carcass can clearly be recognized. When the shoulder portion has recesses and protrusions, the shapes of the recesses and protrusions can also be recognized. Thus, the amount of incision made by a cutting blade can be determined based on the sizes of the recesses and protrusions.

In some embodiments, the contact element is disposed on an outer side in a width direction of the fixing jig which is moved, and is supported pivotally about an axis extending in a horizontal direction along the conveying direction of the fixing jig, and extends toward the conveyance path of the fixing jig so that a tip portion of the contact element is to be in contact with an axilla region of the poultry carcass.

In this configuration, the contact element is supported pivotally about the axis extending in the horizontal direction along the conveying direction of the fixing jig, and extends toward the conveyance path of the fixing jig so that the tip portion of the contact element is to be in contact with the axilla region of the poultry carcass. Thus, the contact element moves while being in contact with the surface of the axilla region of the poultry carcass conveyed along with the movement of the fixing jig. Thus, the contour of the axilla region of the poultry carcass can be formed on the two-dimensional plane. Thus, the contour of the axilla region of the poultry carcass can clearly be recognized. More specifically, the shape of a portion that is not visible from the outer side can be recognized.

In some embodiments, a two-dimensional or three-dimensional image capturing device capable of capturing an image of a contour of the poultry carcass held by the fixing jig, is disposed on a front or back side in a conveying direction of the poultry carcass being moved and above the conveyance path for the fixing jig and is orientated in a direction in which an axilla region of the poultry carcass is clearly visible, and the contour calculation unit is configured to obtain the contour of the measurement target portion of the poultry carcass on the two-dimensional plane, based on data relating to an image captured by the image capturing device and the detected values obtained by the upper and lower direction position sensor and the fixing jig position sensor.

When the poultry carcass is held by the fixing jig with the contour of the axilla region of the poultry carcass deformed along the contour of the fixing jig, the contour of the axilla region of the poultry carcass might be difficult to measure by the contact element in accordance with the individual variation among poultry carcasses. In such a case, an image capturing device oriented in a direction in which the axilla region of the poultry carcass is clearly visible captures an image of the contour the poultry carcass. Thus, the contour calculating unit can obtain the contour of the measurement target portion (including the shape of the axilla region) of the poultry carcass on the two-dimensional plane, based on data relating to the image thus captured by the image capturing device and the detected values obtained by the upper and lower direction position sensor and the fixing jig position sensor.

In some embodiments, a biasing unit configured to elastically bias the tip portion of the contact element toward a surface of the poultry carcass held by the fixing jig is further provided.

In this configuration, the biasing unit is configured to elastically bias the tip portion of the contact element toward the surface of the poultry carcass held by the fixing jig. Thus, the tip portion of the contact element can be constantly kept in a state of being in contact with the surface of the poultry carcass. Thus, the contour of the surface of the poultry carcass can be more accurately recognized.

In some embodiments, the contact element is statically placed on a front side in the conveying direction of the fixing jig which is moved.

In this configuration, the contact element is statically placed on the front side in the conveying direction of the fixing jig which is moved, whereby the contact element can be easily positioned with respect to the poultry carcass held by the fixing jig.

A contour measurement method for measuring a contour of a poultry carcass according to some embodiments of the present invention includes: a holding step of permitting a breast portion of an upper body of an eviscerated poultry carcass having leg portions removed to face forward or backward in a conveying direction, and permitting a fixing jig configured to move while holding the upper body of the poultry carcass from below, to hold the poultry carcass; a contact step of moving the fixing jig toward a contact element supported movably in an upper and lower direction in a two-dimensional plane including the conveying direction of the fixing jig and extending in a vertical direction and configured to be in contact with a measurement target portion of the poultry carcass, and permitting the contact element to be in contact with the measurement target portion of the poultry carcass; a contour measurement step of permitting the contact element to be in contact with the measurement target portion of the poultry carcass in the two-dimensional plane along with a movement of the fixing jig; and a contour calculation step of calculating the contour of the measurement target portion of the poultry carcass on the two-dimensional plane on a basis of positional information of the contact element in the upper and lower direction and positional information of the conveying direction of the fixing jig when the poultry carcass is conveyed by the fixing jig which is moved and when the contact element is in contact with the measurement target portion of the poultry carcass in the two-dimensional plane.

The contour measurement method for measuring a contour of a poultry carcass includes the holding step, the contact step, the contour measurement step, and the contour calculation step. The contour of the measurement target portion of the poultry carcass is obtained on the two-dimensional plane on a basis of positional information of the contact element in the upper and lower direction and positional information of the conveying direction of the fixing jig when the poultry carcass is conveyed by the fixing jig which is moved and when the contact element is in contact with the measurement target portion of the poultry carcass in the two-dimensional plane. With the contour measurement method thus obtained, the contour of a desired area of the poultry carcass can be recognized.

In some embodiments, the measurement target portion of the poultry carcass with which the contact element is to be in contact is a surface of a shoulder portion of the poultry carcass, and the contour calculation step includes a step of adjusting a distance between and a height of a pair of cutting blades based on an obtained contour of a surface of the shoulder portion of the poultry carcass, the pair of cutting blades being supported rotatably to make an incision on joint portions of both shoulders of the poultry carcass.

In this configuration, the contour calculation step includes the step of adjusting the distance between and the height of the pair of cutting blades based on an obtained contour of a surface of the shoulder portion of the poultry carcass, the pair of cutting blades being supported rotatably to make an incision on the joint portions of both shoulders of the poultry carcass. Thus, the distance between and the height of the pair of cutting blades can be adjusted in accordance with the individual variation among poultry carcasses. Thus, an incision can be made at an accurate position regardless of the individual variation among poultry carcasses.

In some embodiments, the measurement target portion of the poultry carcass with which the contact element is to be in contact is a surface of an axilla region of the poultry carcass, and the contour calculation step includes a step of adjusting a distance between a pair of guide rails based on an obtained contour of the surface of the axilla region of the poultry carcass, the pair of guide rails including guide grooves with which body side upper portions of both wings of the poultry carcass are clamped.

In this configuration, the contour calculation step includes the step of adjusting the distance between the pair of guide rails based on an obtained contour of the surface of the axilla region of the poultry carcass, the pair of guide rails including the guide grooves with which body side upper portions of both wings of the poultry carcass are clamped. Thus, the distance between the pair of guiderails can be adjusted in accordance with the individual variation among slaughtered. Thus, the poultry carcass can be certainly separated into breast meat and the rib cage regardless of the individual variation among poultry carcasses.

A deboning device for a poultry carcass according to some embodiments of the present invention includes: a conveyer including a plurality of fixing jigs each configured to move a breast portion of an upper body of an eviscerated poultry carcass having leg portions removed to face forward or backward in a conveying direction while holding the upper body from below, the fixing jigs being arranged at an equal interval along a movement direction; the contour measurement apparatus for measuring a contour of a poultry carcass poultry carcass according to any one of above embodiments, the contour measurement apparatus being disposed so as to face an upstream side of the conveying direction of the conveyer; a plurality of processing units that are disposed on a downstream side of the contour measurement apparatus in the conveying direction of the conveyer; and a control device configured to adjust a position of each of the plurality of processing units relative to a corresponding one of the fixing jigs, based on a contour of the poultry carcass measured by the contour measurement apparatus.

The deboning device for a poultry carcass described above includes the plurality of processing units that are disposed on the downstream side of the contour measurement apparatus in the conveying direction of the conveyer, and the control device is configured to adjust the position of each of the plurality of processing units relative to a corresponding one of the fixing jigs, based on the contour of the poultry carcass measured by the contour measurement apparatus. Thus, the contour of the poultry carcass is recognized at an early stage in the deboning process for the poultry carcass. The positions of the processing units, in other stages, with respect to the fixing jigs are adjusted based on the contour thus recognized. Thus, with the deboning device for a poultry carcass thus obtained, a meat portion can be certainly extracted from the poultry carcass.

In some embodiments, one of the plurality of processing units that is disposed immediately on a downstream side of the contour measurement apparatus in the conveying direction of the fixing jigs is a pair of cutting blades that are used to make an incision on both shoulder joints of the poultry carcass.

In this configuration, the one of the plurality of processing units that is disposed immediately on the downstream side of the contour measurement apparatus in the conveying direction of the fixing jigs is the pair of cutting blades that are used to make an incision on both shoulder joints of the poultry carcass. Thus, an incision can be made on an accurate position on the shoulders regardless of the individual variation among poultry carcasses.

In some embodiments, one of the plurality of processing units that is disposed immediately on a downstream side of the pair of cutting blades in the conveying direction of the fixing jigs is a pair of guide rails including guide grooves for clamping body side upper portions of both wings of the poultry carcass.

In this configuration, the one of the plurality of processing units that is disposed immediately on the downstream side of the pair of cutting blades in the conveying direction of the fixing jigs is the pair of guide rails including the guide grooves for clamping body side upper portions of both wings of the poultry carcass. Thus, the poultry carcass can be certainly separated into breast meat and the rib cage regardless of the individual variation among poultry carcasses.

Advantageous Effects

At least some embodiments of the present invention can provide a contour measurement apparatus and a contour measurement method for measuring a contour of a poultry carcass with which a contour of a desired area of the poultry carcass can be recognized, as well as a deboning device for a poultry carcass.

DETAILED DESCRIPTION

Embodiments of the present invention are described below with reference to the attached drawings, that is, FIGS. 1 to 5. First of all, a deboning device that includes a contour measurement apparatus for measuring a contour of a poultry carcass and executes automatic deboning processing on the poultry carcass is described before a contour measurement apparatus and a contour measurement method for measuring a contour of a poultry carcass according to the present invention are described. Materials, shapes, positional relationships, and the like of components described in the embodiments or illustrated do not limit the scope of the present invention, and are merely examples for description.

Figure 1:
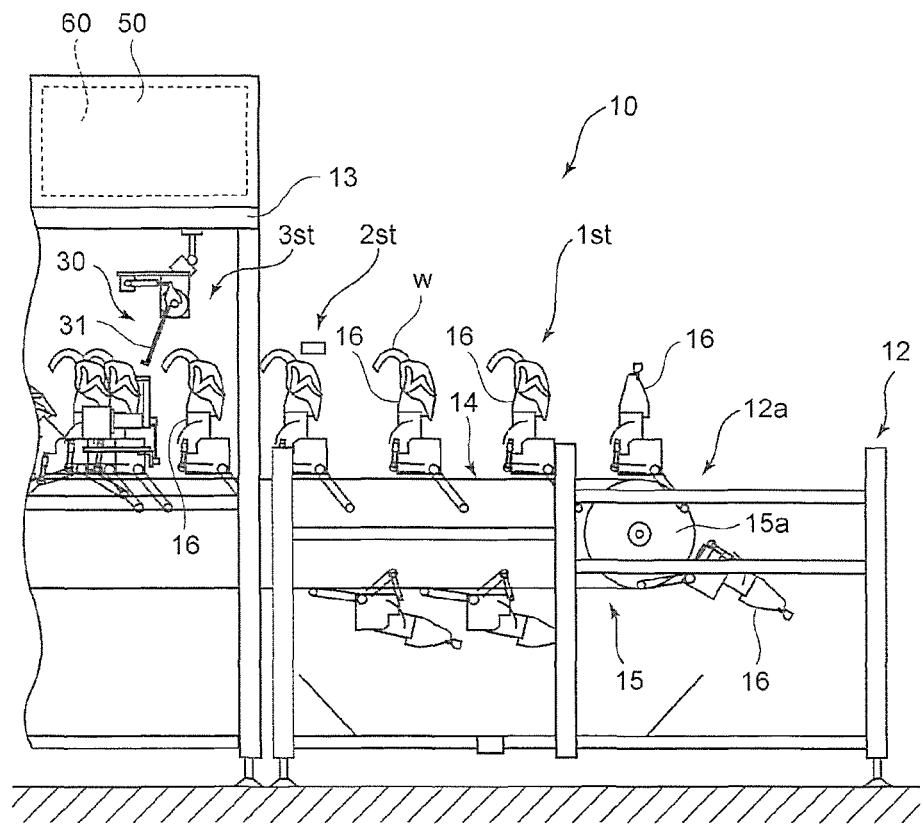
FIG. 1 is a partial front view of a deboning device including a contour measurement apparatus for measuring a contour of a poultry carcass, according to one embodiment of the present invention.

FIG. 1 is a partial front view of a deboning device including a contour measurement apparatus for measuring a contour of a poultry carcass according to one embodiment of the present invention. As illustrated in FIG. 1 (partial front view), this deboning device 10 includes a laterally extending stand 12 provided with an endless chain conveyer 14 extending in the horizontal direction over the entire length of the stand 12. A driving device 15 for the chain conveyer 14 includes: a driven sprocket 15a disposed at a front end portion 12a of the stand 12; a driving sprocket (not illustrated) disposed at a rear end portion of the stand 12; and a driving motor 15b (see FIG. 4) that drives the driving sprocket.

An advancing route of the chain conveyer 14 is a horizontal movement direction from the front end portion 12a to the rear end portion. The chain conveyer 14 is provided with multiple cones 16 (fixing jigs), each having a conical shape, arranged at an equal interval along the movement direction. The cones 16 can each be inclined by a predetermined angle, from its vertically standing posture, forward and rearward in the conveying direction by a link mechanism (not illustrated), and are linearly conveyed at constant speed by the chain conveyer 14. The chain conveyer 14 is provided with an encoder 17 (See FIG. 4) that measures a movement amount of the chain conveyer 14. The encoder 17 transmits a measured value to a control device 60 (see FIG. 4) described below.

A plurality of processing stations are arranged from an upstream side to a downstream side in the conveying direction of the chain conveyer 14. A poultry carcasses such as a chicken (hereinafter, referred to as "workpiece W") is subjected to deboning processing executed in the processing stations to be separated into a meat portion and a bone portion. In the present embodiment, first to third stations 1st to 3st of the plurality of processing stations will be described. In the first station 1st, the workpiece W is set on the cone 16 and is positioned. In the second station 2st, the workpiece W is fixed to the cone 16. In the third station 3st, the contour of the workpiece W is measured.

In the first station 1st, an operator places the workpiece W on the cone 16 at the front end portion 12a of the chain conveyer 14. The workpiece W is an upper body of the poultry carcass that has been subjected to feather removal, blood drainage, and evisceration, and then had its legs removed. The workpiece W is placed on the cone 16 with its breast portion facing rearward in the conveying direction.

Figure 2:
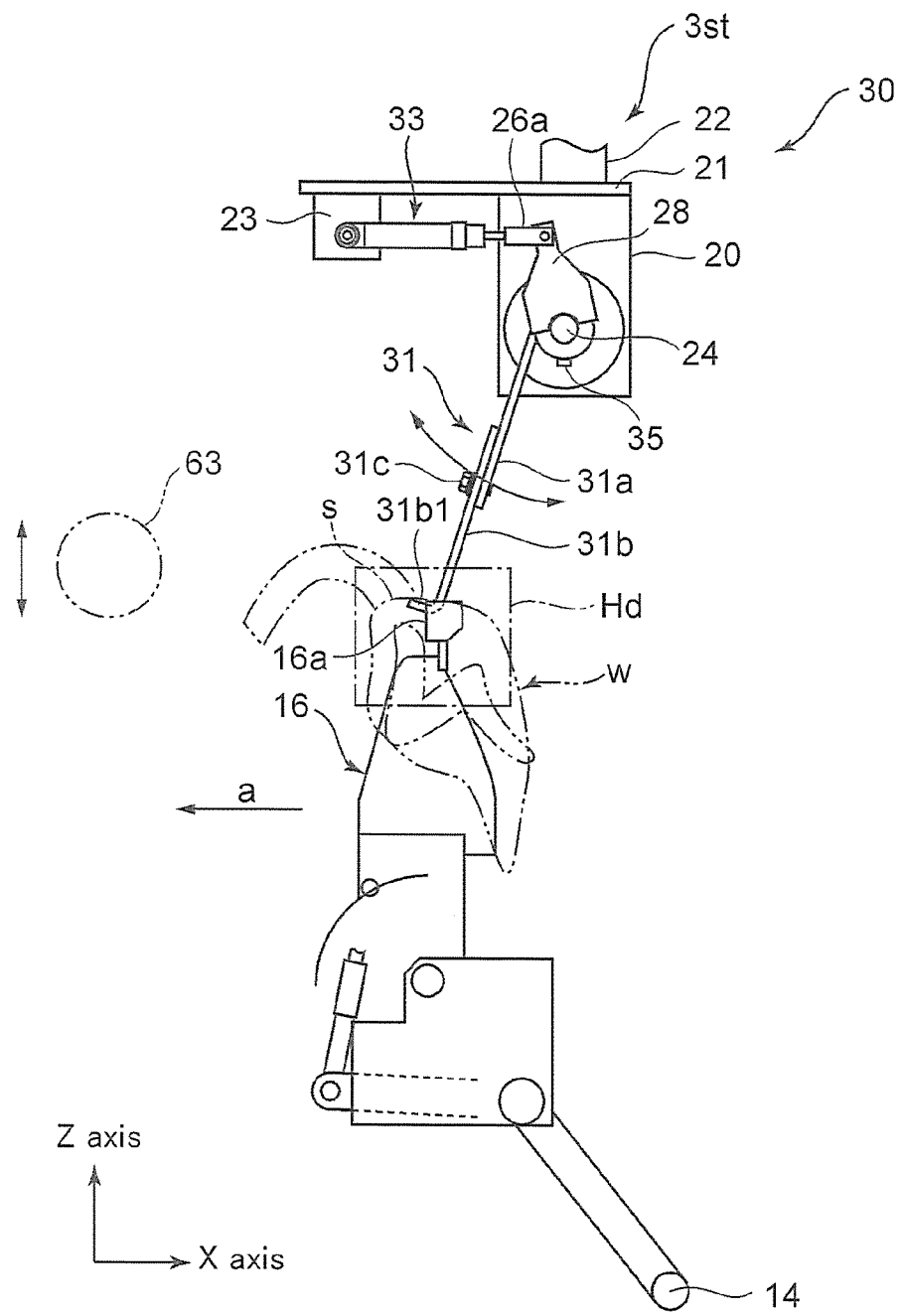
FIG. 2 is a front view of the contour measurement apparatus that measures a contour of a shoulder portion of a poultry carcass, according to one embodiment of the present invention.
Figure 3:
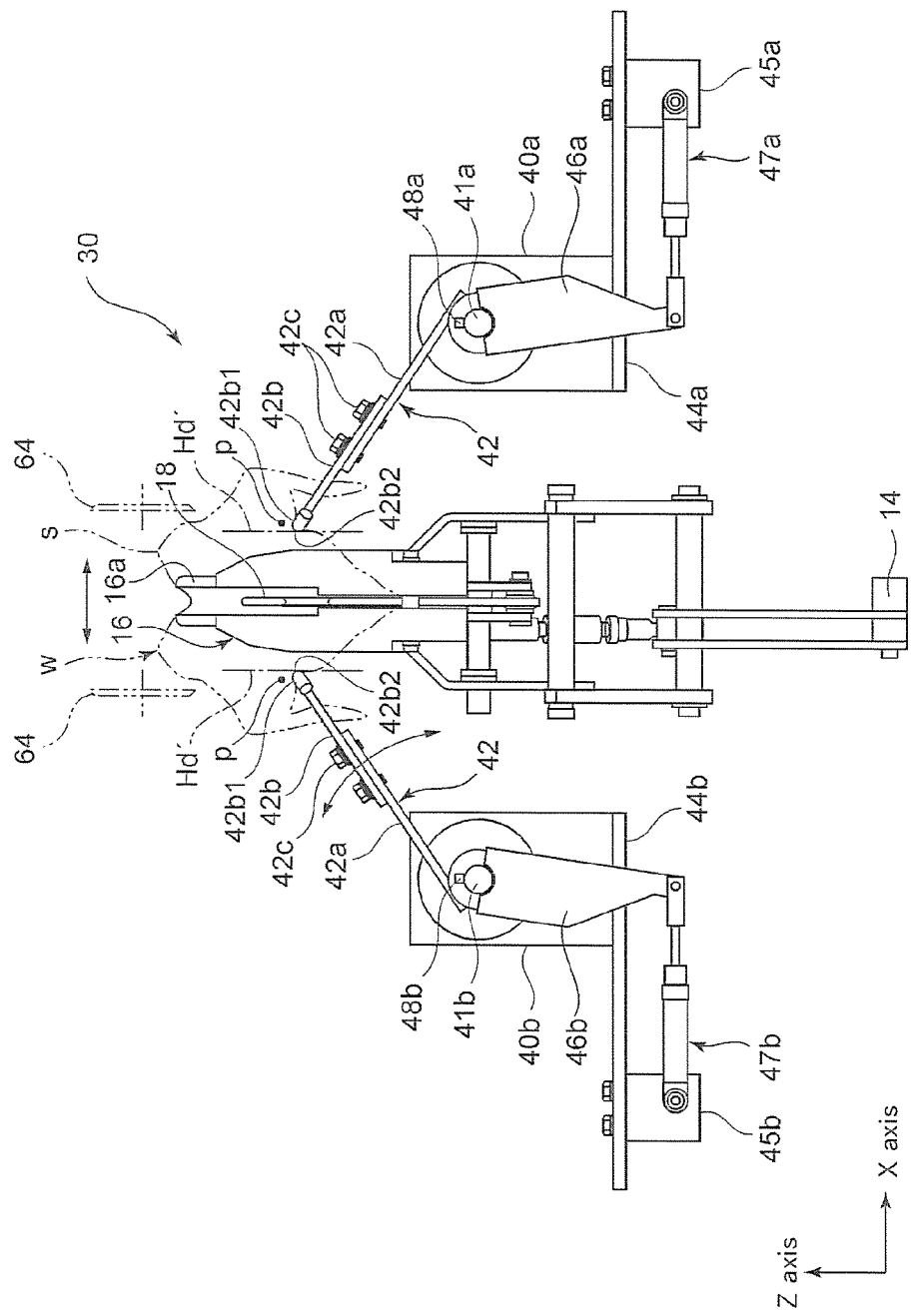
FIG. 3 is a side view of a contour measurement apparatus that measures an axilla region of a poultry carcass, according to one embodiment of the present invention.

As illustrated in FIG. 2 (front view) and FIG. 3 (side view), the cone 16 has an upper end provided with a stopper 16a that positions the workpiece W to be constantly at the same height. A hook 18 (See FIG. 3) is provided on a rear side of the cone 16 in the conveying direction, and can be moved in an upper and lower direction by a link mechanism (not illustrated). The hook 18 is lowered by the link mechanism to be secured to the center of the breastbone of the workpiece W so that the workpiece W is fixed to the cone 16. In the second station 2st, disposed on the downstream side of the first station 1st in the conveying direction of the cone 16, the center of the breastbone of the workpiece W is secured by the hook 18 so that the workpiece W is fixed to the cone 16.

In the third station 3st, disposed on the downstream side of the second station 2st in the conveying direction of the cone 16, the contour measurement apparatus 30 measures the contour of a measurement target portion (a shoulder portion and an axilla region) of the workpiece W.

A pair of round blades 63 (cutting blades) are rotatably provided on the downstream side of the third station 3st in the conveying direction of the cone 16, and cut both shoulder joints and a humeral head of the workpiece W (see FIG. 2). The pair of round blades 63 can have the distance therebetween in the width direction of the cone 16 as well as their height adjusted. A pair of guiderails 64 is provided on the downstream side than the pair of round blades 63 in the conveying direction of the cone 16, and are used for separating the workpiece W into a breast meat portion (with wings) and the rib cage (see FIG. 3). The guiderails 64 extends in the conveying direction of the cones 16, and are open at a position facing the drumette of the workpiece W. The pair of guiderails 64 can have the distance therebetween adjusted.

Next, the contour measurement apparatus 30 is described with reference to FIG. 2 to FIG. 5. As illustrated in FIG. 2, the contour measurement apparatus 30 is disposed above the cones 16 being moved, and includes: a contact element 31 that can pivot toward the front and the rear in the conveying direction of the cone 16 moving while supporting the workpiece W, and has a tip portion that can be in contact with a surface of the workpiece W; an air cylinder 33 that elastically biases the tip portion of the contact element 31 toward the workpiece W supported by the cone 16; an angular sensor 35 that detects a rotational angle of the contact element 31; the encoder 17 (see FIG. 4) that detects the position of the cone 16 in a state where the contact element 31 is in contact with the workpiece W; and the control device 60 (see FIG. 4) that obtains the contour of the measurement target portion (shoulder portion and axilla) of the workpiece W based on detected values from the angular sensor 35 and the encoder 17.

The contact element 31 is attached to a shaft 24 rotatably supported above the conveying path of the cone 16 in the third station 3st. The shaft 24 is rotatable relative to a measurement block 20 provided above the conveying path of the cone 16, and horizontally extends in a direction orthogonal to the cone conveying direction. The contact element 31 includes: a base end side bar 31a having one end portion fixed to the shaft 24 and another end side extending downward; and a tip side bar 31b having one end portion attached to the other end portion of the base end side bar 31a and another end side extending downward.

The attached position of the tip side bar 31b on the base end side bar 31a is adjustable via a bolt 31c, whereby the length of the contact element 31 is adjustable. The tip side bar 31b has the tip bent forward in the conveying direction of the cone 16 so as to more smoothly slide while being contact with the surface (shoulder portion s) of the workpiece W. The bent portion of the tip side bar 31b is referred to as "tip portion 31b1 of the contact element 31".

The tip portion 31b1 of the contact element 31 is supported in such a manner as to be movable in the upper and lower direction in a two-dimensional plane Hd that includes the conveying direction of the cone 16 and extends in the vertical direction. Thus, the contact element 31 can pivot about the shaft 24 frontward and rearward, and has the tip portion 31b1 capable of being in contact with the surface of the shoulder portion s of the workpiece W on the two-dimensional plane Hd. The contact element 31 is statically placed on a front side in the conveying direction of the workpiece W when the contact element 31 is not in contact with the workpiece W held by the cone 16. The two-dimensional plane Hd may be slightly inclined with respect to the vertical direction.

The measurement block 20 is fixed by a supporting plate 21 attached on a portion above the measurement block 20. The supporting plate 21 is fixed to a frame 13 (see FIG. 1) via a coupling member 22. The supporting plate 21 extends forward in the conveying direction of the cone 16 being moved, and has a forward end portion provided with a protruding plate 23 protruding downward. An arm 28 extending upward is fixed to the shaft 24, and thus pivots along with the rotation of shaft 24. The air cylinder 33 is disposed between the protruding plate 23 and the arm 28.

The air cylinder 33 has a bottom side end portion rotatably supported by the protruding plate 23 and a rod side end portion rotatably supported by the arm 28. The air cylinder 33 applies biasing force by expanding in an expanding direction upon receiving a load in a compressing direction, and applies biasing force by contracting in a contracting direction upon receiving a load in the expanding direction. Thus, when the contact element 31 pivots rearward, the air cylinder 33 receives the load in the compressing direction via the arm 28, and thus applies the biasing force by expanding in the expanding direction. All things considered, the tip portion 31b1 of the contact element 31 can constantly be in contact with the surface (shoulder portion s) of the workpiece W. The shaft 24 is provided with the angular sensor 35 that measures the rotational angle of the shaft 24. The angular sensor 35 transmits the detection signal thus obtained to the control device 60 described below.

The third station 3st is provided with a pair of measurement blocks 40a and 40b attached to the stand 12 while being arranged on both sides of the cone 16 in the width direction as illustrated in FIG. 3 (side view). The measurement blocks 40a and 40b rotatably supports shafts 41a and 41b that horizontally extend along the conveying direction of the cone 16. Contact elements 42 each have one end portion fixed to corresponding one of the shafts 41a and 41b.

The contact element 42 includes a base end side bar 42a having one end portion fixed to the shaft 41a or 41b and the other end side extending upward; and a tip side bar 42b having one end portion attached to the other end portion of the base end side bar 42a and the other end side extending upward, as in the case of the contact element 31 to be in contact with the shoulder portion s of the workpiece W. The attached position of the tip side bar 42b on the base end side bar 42a is adjustable via a bolt 42c, whereby the length of the contact element 42 is adjustable. A curved surface 42b2 in a hemispherical form is formed on the tip portion 42b1 of the tip side bar 42b to facilitate the insertion to the axilla region p of the workpiece W.

The tip portion 42b1 of the contact element 42 is supported to be movable in the upper and lower direction in a two-dimensional plane Hd' including the conveying direction of the cone 16 and extending in the vertical direction. Thus, the contact element 42 can pivot in the upper and lower direction about each of the shafts 34a and 34b, and has the tip portion 42b1 capable of being in contact with the surface of the axilla region p of the workpiece W on the two-dimensional plane Hd'. The two-dimensional plane Hd' may be slightly inclined with respect to the vertical direction.

The measurement blocks 40a and 40b are fixed to supporting plates 44a and 44b attached to portions below the measurement blocks 40a and 40b. The supporting plates 44a and 44b are fixed to the stand 12 (see FIG. 1) via a coupling member (not illustrated). The supporting plates 44a and 44b extend outward in the width direction of the cone 16 being moved, and have tip side end portions provided with protruding plates 45a and 45b protruding downward. Arms 46a and 46b extending downward are fixed to the shafts 41a and 41b. Thus, the arm 46a and 46b pivot along with the rotation of the shafts 41a and 41b.

Air cylinders 47a and 47b are disposed between the protruding plates 45a and 45b and the arms 46a and 46b. The air cylinders 47a and 47b have bottom side end portions rotatably supported by the protruding plates 45a and 45b and rod side end portion rotatably supported by the arms 46a and 46b. The air cylinders 47a and 47b have the same configuration as the air cylinder 33 that biases the contact element 31 (see FIG. 2) described above, and thus will not be described.

When the tip portions 42b1 of the contact elements 42 move downward, the air cylinders 47a and 47b receive the load in the compressing direction via the arms 46a and 46b, and thus applies the biasing force by expanding. Thus, the tip portion 42b1 of the contact element 42 can constantly be in contact with the surface of the workpiece W.

The tip portion 42b1 of the contact element 42, not being in contact with the workpiece W supported by the cone 16, is statically placed on the front side in the conveying direction of the workpiece W, and is positioned to be in contact with the axilla region p of the workpiece W. The contact element 42 in contact with the axilla region p of the workpiece W receives the biasing force (elastic force) from the air cylinders 47a and 47b, and thus can follow the surface of the axilla region p.

The shafts 41a and 41b are provided with angular sensors 48a and 48b that measure the rotational angles of the shafts 41a and 41b. The angular sensors 48a and 48b transmit detection signals thus obtained to the control device 60 (see FIG. 4) described later. In FIG. 2 and FIG. 3, the Z axis represents the vertical direction, the X axis represents the conveying direction of the cone 16, and the Y axis represents a direction orthogonal to the conveying direction of the cone 16.

Figure 4:
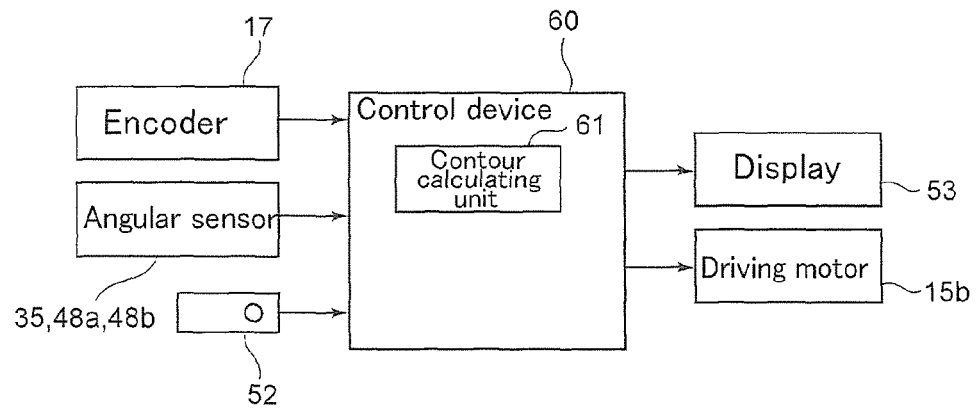
FIG. 4 is a block diagram illustrating a control device that calculates the contour of the poultry carcass, according to one embodiment of the present invention.

As illustrated in FIG. 1, the control device 60 is accommodated ill a container box 50 disposed on an upper side of the third station 3st. The container box 50 is attached to the frame 13 extending above the third station 3st. As illustrated in FIG. 4, the control device 60 is electrically connected to the encoder 17, the angular sensors 35, 48a, and 48b, a driving switch 52, a display 53, and the driving motor 15b.

When the driving switch 52 is turned ON, the control device 60 controls the operation of the driving motor 15b in such a manner that the cone 16 moves at predetermined speed. The control device 60 includes a contour calculating unit 61. The contour calculating unit 61 uses polar coordinates to calculate a contact position ill contact with the workpiece W, from the lengths of the contact elements 31 and 42 in the axial direction, and angles of the contact elements 31, 42, in contact with the workpiece W, with respect to a reference line, based on the measurement signal from the angular sensors 35, 48*a*, and 48*b*. The control device 60 calculates the contour of the measurement target portion (the shoulder portion and the axilla region) of the workpiece W from a calculated contact position including the contact information of the conveying direction of the cone 16 input from the encoder 17. The control device 60 adjusts the distance between and the height of the round blades 63 and the distance between the pair of guiderails 64 based on the contour of the measurement target portion (shoulder portion or axilla region) of the workpiece W thus calculated.

Next, the contour measurement method for a poultry carcass according to one embodiment of the present invention will be described. As illustrated in FIG. 1, first of all, in the first station 1st, the workpiece W as the upper body which has had its legs removed and eviscerated is supported on the cone 16 that can hold the upper body from below, with the breast portion of the workpiece W facing the upstream side in the conveying direction (holding step). In the holding step, the workpiece W held by the cone 16 is positioned to be at a constant height by the shoulder stopper 16*a* (see FIG. 2 and FIG. 3) of the cone 16. The workpiece W thus positioned by the cone 1 moves from the first station 1st to the second station 2st along with the movement of the cone 16. In the second station 2st, the center of the breastbone of the workpiece W is secured by the hook 18 provided to the cone 16, so that the workpiece W is fixed to the cone 16.

When the workpiece W is thus fixed to the cone 16, the workpiece W moves from the second station 2st to the third station 3st along with the movement of the cone 16. In the third station 3st, the tip portion 31*b*1 of the contact element 31 of the contour measurement apparatus 30 contacts the surface of the shoulder portions of the workpiece W on the two-dimensional plane Hd, whereas the tip portion 42*b*1 of the contact element 42 of the contour measurement apparatus 30 contacts the surface of the axilla region p of the workpiece W on the two-dimensional plane Hd' (contact step) as illustrated in FIG. 2 and FIG. 3. When the tip portions 31*b*1 and 42*b*1 of the contact elements 31 and 42 are in contact with the surfaces of the shoulder portion s and the axilla region p of the workpiece W, the contact elements 31 and 42 pivot about the shafts 24, 41*a*, and 41*b*.

When the cone 16 further moves forward in the conveying direction while the tip portions 31*b*1 and 42*b*1 of the contact elements 31 and 42 are in contact with the surfaces of the shoulder portion s and the axilla region p of the workpiece W, the tip portion 31*b*1 of the contact element 31, in contact with the surface of the shoulder portion s of the workpiece W, moves on the two-dimensional plane Hd while being in contact with and following the surface of the shoulder portion s. The tip portion 42*b*1 of the contact element 42 in contact with the surface of the axilla region p of the workpiece W moves on the two-dimensional plane Hd' while being in contact with and following the surface of the axilla region p (contour measurement step). In this process, the angular sensors 35, 48*a*, and 48*b* that detect the rotational angles of the contact elements 31 and 42 transmit the detection signals to the control device 60.

The contour calculating unit 61 of the control device 60 calculates the contour of the shoulder portion s of the workpiece W on the two-dimensional plane Hd and calculates the contour of the axilla region p on the two-dimensional plane Hd', based on the detection signals from the angular sensors 35, 48*a*, and 48*b* and the positional information on the conveying direction of the cone 16 from the encoder 17 transmitted while the contact elements 31 and 42 are in contact with the workpiece W (contour calculation step). The control device 60 causes the display 53 to display the contour of the shoulder portion s of the workpiece W on the two-dimensional plane Hd and the contour of the axilla region p on the two-dimensional plane Hd' thus calculated (see FIG. 5).

Figure 5:
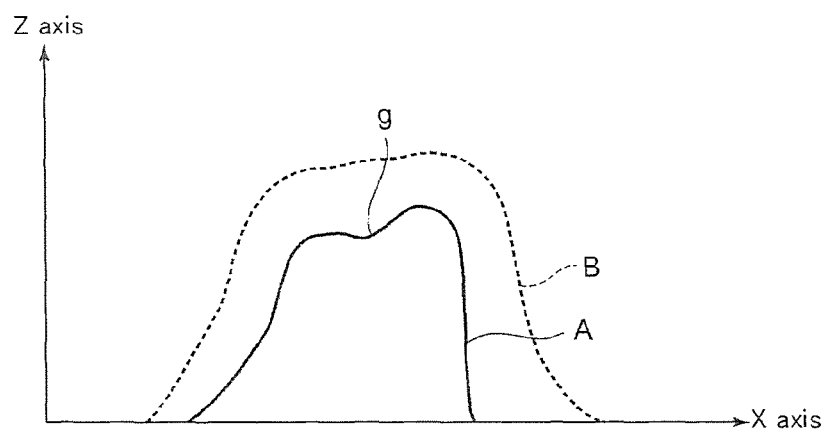
FIG. 5 is a diagram illustrating lines, representing contours of the poultry carcass, displayed on a display, according to one embodiment of the present invention.

In FIG. 5, a solid line A and a broken line B respectively represent the contours of the shoulder portion s and the axilla region p of the workpiece W, displayed on the display 53. With the contour of the workpiece W thus displayed, a recess g on the surface of the workpiece W can be clearly displayed on the display 53.

The distance between and the height of the pair of round blades 63 (cutting blades) that are supported rotatably to make incision on both shoulder joints of the workpiece W are adjusted by the contour calculating unit 61 of the control device 60, based on the contour of the surface of the shoulder portion s of the workpiece W thus obtained. The contour calculating unit 61 adjusts the distance between the pair of guiderails 64 for clamping the body side upper portions of both wings of the workpiece W from the contour of the surface of the axilla region p of the workpiece W thus obtained.

As described above, in the present embodiment, in the third station 3st, the contact elements 31 and 42 in contact with the measurement target portions (the shoulder portion s and the axilla region p) of a poultry carcass move on the two-dimensional planes Hd and Hd' while being in contact with the measurement target portions (the shoulder portion s and the axilla region p) of the poultry carcass along with the movement of the cone 16. The contour calculating unit 61 obtains the contours of the shoulder portion s and the axilla region p of the poultry carcass on the two-dimensional planes Hd and Hd', based on the detected values from the angular sensor 35 and the encoder 17, while the contact elements 31 and 42 are in contact with the poultry carcass. Thus, the contours of the shoulder portion s and the axilla region p of the poultry carcass can certainly be recognized.

When the workpiece W is held by the cone 16 with the contour of the axilla region of the workpiece W deformed along the contour of the cone 16, the contour of the axilla region p of the workpiece W that differs due to the individual variation of the workpiece W might be difficult to measure with the contact element 42. In such a case, an image of the contour of the workpiece W is captured by a two or three-dimensional camera.

Such a camera is disposed on the downstream side of the conveying direction of the workpiece W and above the conveying path for the cone 16, while being orientated in a direction in which the axilla region p of the workpiece W is clearly visible. The camera is electrically connected to the control device 60, whereby data relating to an image captured by the camera is transmitted to the control device 60 to be processed by the contour calculating unit 61. The contour calculating unit 61 estimates the contour of the axilla region p of the workpiece W from the image data thus obtained from the camera. The control device 60 adjusts the distance between and the height of the round blades 63 and the distance between the pair of guiderails 64, based on the contour of the shoulder portion of the workpiece W thus calculated and the contour of the axilla region of the workpiece W thus estimated.

The air cylinder 33 applies the biasing force (elastic force) to the contact elements 31 and 42, whereby the tip portions 31b1 and 42b1 of the contact elements 31 and 42 can follow the measurement target portion (the shoulder portion s and the axilla region p) of the workpiece W. Thus, the contour of the workpiece W can be accurately recognized, and the shape of a recess that is not visible from the outer side can also be recognized.

The contact elements 31 and 42 are statically placed while facing the conveyance path for the workpiece W, and thus the contact elements 31 and 42 can be easily positioned with respect to the workpiece W.

The pair of round blades 63 (cutting blades) that makes the incision on both shoulder joints of the workpiece W (poultry carcass) are disposed on the downstream side of the contour measurement apparatus 30 in the cone conveying direction and their positions are adjustable. Thus, the incision can be made at an accurate position of the shoulder, regardless to the individual variation of the workpiece W (poultry carcass).

The pair of guiderails 64 having a guide grooves for clamping the body side upper portions of both wings of the workpiece W (poultry carcass) are disposed on the downstream side of the pair of round blades 63 in the cone conveying direction, and their positions are adjustable. Thus, the workpiece W (poultry carcass) can be certainly separated into breast meat and the rib cage, regardless of the individual variation among the workpieces W.

In the embodiment described above, the air cylinder 33 applies the biasing force to the contact elements 31 and 42, so that the contact elements 31 and 42 can follow the surface of the workpiece W. Alternatively, the biasing force may be applied with elastic force of a spring member or gravity of a weight, instead of using the air cylinder 33.

The invention claimed is:

1. A contour measurement apparatus for measuring a contour of a poultry carcass which is eviscerated and which has leg portions removed, the contour measurement apparatus comprising:
   a fixing jig on which the poultry carcass is placed and fixed;
   a conveyer forming a conveyance path for the fixing jig and configured to convey the fixing jig along the conveyance path;
   a contact element that is supported movably in an upper and lower direction within a two-dimensional plane including a conveying direction of the fixing jig and extending in a vertical direction, and is able to be in contact with a measurement target portion of the poultry carcass;
   an upper and lower direction position sensor configured to detect a position of the contact element in the upper and lower direction;
   a fixing jig position sensor configured to detect a position of the fixing jig moving in the conveying direction; and
   a contour calculation unit configured to calculate a contour of the measurement target portion of the poultry carcass on the two-dimensional plane based on detected values obtained by the upper and lower direction position sensor and the fixing jig position sensor along with a movement of the poultry carcass held and conveyed by the fixing jig.

2. The contour measurement apparatus for measuring a contour of a poultry carcass according to claim 1, wherein the contact element is disposed at a position above the fixing jig which is moved, and is supported pivotally about an axis that extends in a horizontal direction orthogonally to the conveying direction of the fixing jig, and extends downward so that a tip portion of the contact element is to be in contact with a shoulder portion of the poultry carcass.

3. The contour measurement apparatus for measuring a contour of a poultry carcass according to claim 1, wherein the contact element is disposed on an outer side in a width direction of the fixing jig which is moved, and is supported pivotally about an axis extending in a horizontal direction along the conveying direction of the fixing jig, and extends toward the conveyance path of the fixing jig so that a tip portion of the contact element is to be in contact with an axilla region of the poultry carcass.

4. The contour measurement apparatus for measuring a contour of a poultry carcass according to claim 1, wherein
   a two-dimensional or three-dimensional image capturing device capable of capturing an image of a contour of the poultry carcass held by the fixing jig, is disposed on a front or back side in a conveying direction of the poultry carcass being moved and above the conveyance path for the fixing jig and is orientated in a direction in which an axilla region of the poultry carcass is clearly visible, and
   wherein the contour calculation unit is configured to obtain the contour of the measurement target portion of the poultry carcass on the two-dimensional plane, based on data relating to an image captured by the image capturing device and the detected values obtained by the upper and lower direction position sensor and the fixing jig position sensor.

5. The contour measurement apparatus for measuring a contour of a poultry carcass according to claim 1, further comprising:
   a biasing unit configured to elastically bias the tip portion of the contact element toward a surface of the poultry carcass held by the fixing jig.

6. The contour measurement apparatus for measuring a contour of a poultry carcass according to claim 1, wherein the contact element is statically placed on a front side in the conveying direction of the poultry carcass when the contact element is not in contact with the poultry carcass held by the fixing jig.

7. A deboning device for a poultry carcass comprising:
   a conveyer including a plurality of fixing jigs each configured to move a breast portion of an upper body of an eviscerated poultry carcass having leg portions removed to face forward or backward in a conveying direction while holding the upper body from below, the fixing jigs being arranged at an equal interval along a movement direction;
   the contour measurement apparatus for measuring a contour of a poultry carcass poultry carcass according to claim 1, the contour measurement apparatus being disposed so as to face an upstream side of the conveying direction of the conveyer;
   a plurality of processing units that are disposed on a downstream side of the contour measurement apparatus in the conveying direction of the conveyer; and
   a control device configured to adjust a position of each of the plurality of processing units relative to the fixing jigs, based on a contour of the poultry carcass measured by the contour measurement apparatus.

8. The deboning device for a poultry carcass according to claim 7, wherein
   one of the plurality of processing units that is disposed immediately on a downstream side of the contour measurement apparatus in the conveying direction of the fixing jigs is a pair of cutting blades that are used to make an incision on both shoulder joints of the poultry carcass.

9. The deboning device for a poultry carcass according to claim 8, wherein
one of the plurality of processing units that is disposed immediately on a downstream side of the pair of cutting blades in the conveying direction of the fixing jigs is a pair of guide rails including guide grooves for clamping body side upper portions of both wings of the poultry carcass.

10. A contour measurement method for measuring a contour of a poultry carcass, the contour measurement method comprising:
a holding step of permitting a breast portion of an upper body of an eviscerated poultry carcass having leg portions removed to face forward or backward in a conveying direction, and permitting a fixing jig configured to move while holding the upper body of the poultry carcass from below, to hold the poultry carcass;
a contact step of moving the fixing jig toward a contact element supported movably in an upper and lower direction in a two-dimensional plane including the conveying direction of the fixing jig and extending in a vertical direction and configured to be in contact with a measurement target portion of the poultry carcass, and permitting the contact element to be in contact with the measurement target portion of the poultry carcass;
a contour measurement step of permitting the contact element to be in contact with the measurement target portion of the poultry carcass in the two-dimensional plane along with a movement of the fixing jig; and
a contour calculation step of calculating the contour of the measurement target portion of the poultry carcass on the two-dimensional plane on a basis of positional information of the contact element in the upper and lower direction and positional information of the conveying direction of the fixing jig when the poultry carcass is conveyed by the fixing jig which is moved and when the contact element is in contact with the measurement target portion of the poultry carcass in the two-dimensional plane.

11. The contour measurement method for measuring a contour of a poultry carcass according to claim 10, wherein
the measurement target portion of the poultry carcass with which the contact element is to be in contact is a surface of a shoulder portion of the poultry carcass, and
wherein the contour calculation step includes a step of adjusting a distance between and a height of a pair of cutting blades based on an obtained contour of a surface of the shoulder portion of the poultry carcass, the pair of cutting blades being supported rotatably to make an incision on joint portions of both shoulders of the poultry carcass.

12. The contour measurement method for measuring a contour of a poultry carcass according to claim 10, wherein
the measurement target portion of the poultry carcass with which the contact element is to be in contact is a surface of an axilla region of the poultry carcass, and
wherein the contour calculation step includes a step of adjusting a distance between a pair of guide rails based on an obtained contour of the surface of the axilla region of the poultry carcass, the pair of guide rails including guide grooves with which body side upper portions of both wings of the poultry carcass are clamped.

\* \* \* \* \*